D. HJORTH.
ELECTRIC WIRE OUTLET BOX.
APPLICATION FILED JAN. 28, 1919.
1,309,625.
Patented July 15, 1919.
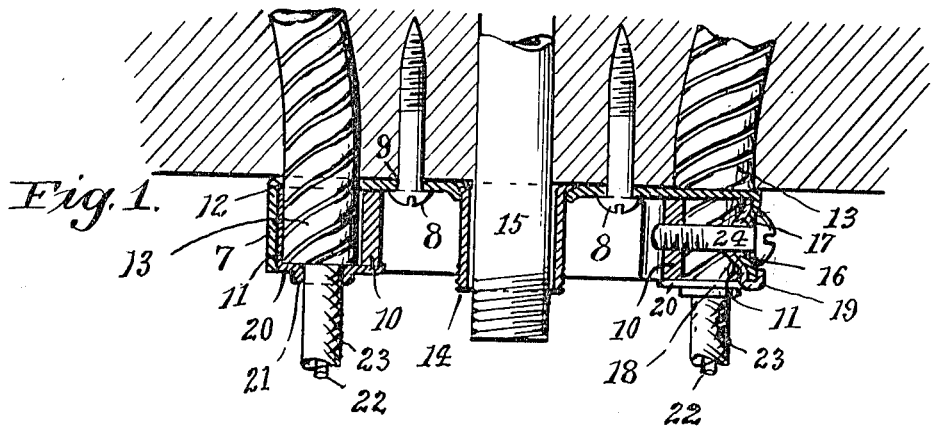
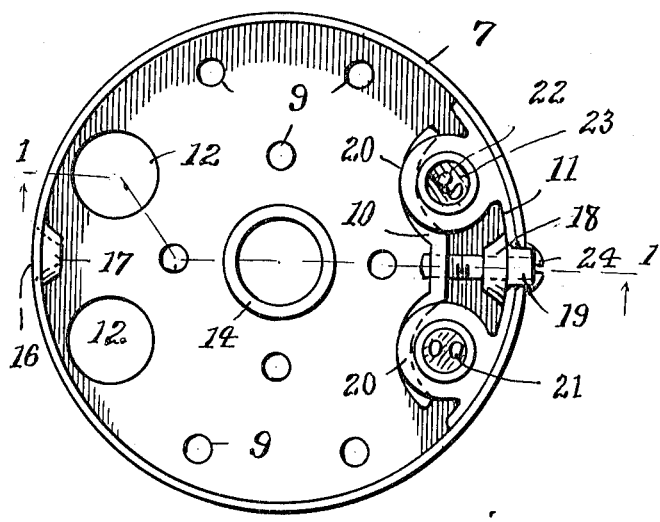
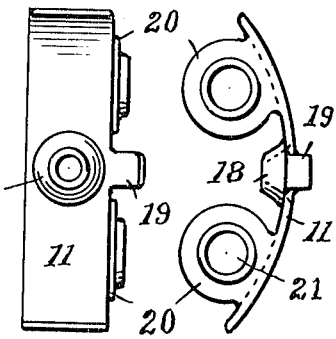
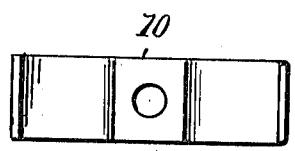
Inventor
David Hjorth
By Chamberlain + Newman
Attorneys

UNITED STATES PATENT OFFICE.

DAVID HJORTH, OF BRIDGEPORT, CONNECTICUT, ASSIGNOR TO THE GENERAL MACHINE AND MANUFACTURING COMPANY, OF BRIDGEPORT, CONNECTICUT, A CORPORATION OF CONNECTICUT.

ELECTRIC-WIRE-OUTLET BOX.

1,309,625. Specification of Letters Patent. Patented July 15, 1919.

Application filed January 28, 1919. Serial No. 273,631.

*To all whom it may concern:*

Be it known that I, DAVID HJORTH, a citizen of the United States, and resident of Bridgeport, in the county of Fairfield and State of Connecticut, have invented certain new and useful Improvements in Electric-Wire-Outlet Boxes, of which the following is a specification.

My invention relates to new and useful improvements in ceiling outlet boxes for positioning and supporting electric cables as well as electric lighting fixtures connected therewith.

The purpose of the invention is to construct a simple and inexpensive form of ceiling outlet box, or plate as they are frequently called, so that the same may be made from sheet metal, to be comparatively light in weight and inexpensive to manufacture; to provide a plate that may be conveniently attached to a wall with a few screws;

To arrange the device so that the cables may be supported singly or in pairs, by a single clamping screw and so that each cable will be in a definite and fixed position and further to arrange the plate so that the same may be used either in connection with gas pipe outlets for combination lights or for supporting electric fixtures only.

Further objects of the invention will be apparent from the description of the following specification wherein a preferred form of my invention is illustrated and described, but it will be evident that slight changes can be made from that shown without departing from the spirit or sacrificing any of the advantages of the invention.

Similar characters of reference will be found to denote like or corresponding parts throughout the several figures of the accompanying drawings forming a part of this specification, and upon which;

Figure 1 shows a central vertical sectional view of my improved form of ceiling outlet box taken on line 1—1 of Fig. 2.

Fig. 2 is a bottom plan view of the same showing two cables positioned therein upon one side and with the cable supporting devices omitted from the other side;

Fig. 3 shows a detached side and edge view of the two sheet metal clamping members; and Fig. 4 is a detached side elevation of the clamping yoke for securing the cables in position.

In Fig. 1 of the drawings I have shown my improved form of outlet box attached to a ceiling, as it would appear in practice, the box being shown in cross section and the cables in side elevation. As shown in this figure the box 7 is secured to the ceiling by means of attaching screws 8 any desired number of which may be placed through the holes 9 arranged in its back portion.

This outlet box as constructed is stamped up from sheet metal and includes a flat back portion through which the attaching screws are inserted and an annular depending wall to which the clamping member 10 and the support 11 are secured. Suitable openings 12 are arranged in the back of the box to receive the cables 13. These holes are preferably arranged in pairs, two upon each side in substantially the manner indicated. The center of the back of the box is also provided with an opening in which a sleeve 14 is secured. This sleeve may serve to surround a projecting gas pipe 15 or it may in itself form a threaded nipple to which the electric fixture, not shown is attached. Screw holes 16 are formed in the two opposite side walls and the stock surrounding each hole is struck in to form a boss 17 to engage the concave portion 18 of the support 11. This support is formed of relatively thin sheet metal and in part is shaped to conform to the inner side wall of the box including the boss 17 before mentioned. When positioned in the box these two sheet metal members 10 and 11 are in engagement with each other. A projection 19 is formed on the lower edge of this body portion, and is preferably in alinement with the screw, and is adapted to be bent over the edge of the wall and down over the outside to hold the stop in position as shown. Two extensions 20 are also formed integral with this member and are projected inward so that the holes 21 formed therein aline with the openings 12 in the back and so that the marginal portions will serve as a stop for the ends of the flexible armor. As will be seen from Figs. 1 and 2 a portion of each of these extensions rests upon the under edge of the yoke 10 and the said yoke is thus supported between the back of the box and said extensions. The curved portions of this yoke 10 obviously engages the side of the metal armor in a way to clamp the same against the box when the clamping screws 24 are tightened.

Referring to the cables it will be noted that the wires 22 are contained within the fabric conduit or loom 23 and that the latter are mounted within the outer flexible armor 13 before mentioned. In practice these cables are run through a building and into the outlet boxes in substantially the manner indicated. According to the particular construction of my box I have arranged to have the ends of the armor abut against the inner face of the marginal flanges 20 while the fabric covered wires extend through the holes 21 and are free to be connected under the canopy, not shown, with the wires from the electric light fixtures, not shown.

These boxes as before stated are provided with two pairs of holes and are thus adapted to accommodate four cables if desired and where but one or two are used the extra openings in the back of the box would be closed with the sheet metal disks which are stamped therefrom.

It will accordingly be noted and understood from the foregoing illustrations that the wires may be very quickly positioned in one of my outlet boxes and likewise readily secured thereto by the tightening of the clamping screws and whereby the yoke is clamped against the two flexible cables.

Having thus described my invention what I claim and desire to secure by Letters Patent, is:

1. An outlet box formed of sheet metal and including a back having cable openings therethrough and depending side walls with screw holes therein, a yoke adapted to engage cables when positioned in the cable openings, a screw arranged in the hole of the side wall to engage the yoke, a stop plate including a body portion to fit against the inner face of the side wall and having extensions with holes to receive the wires and means for securing the body portion to the side wall of the box.

2. An outlet box formed of sheet metal and including a back having cable openings therethrough and depending side walls with screw holes therein, a yoke adapted to engage the cables when positioned in the said openings, a screw arranged in the hole of the side wall to engage the yoke, a stop plate including a curved body portion to fit against the inner face of the side wall and having an integral member to overlap the side wall for attachment thereto.

3. An outlet box including a back and side walls, and having pairs of openings in the back and screw holes in the side walls, a yoke adapted to engage cables when positioned in the openings and screws positioned in the holes of the side walls and engaging the yoke to clamp the same, a stop plate fitted to the inside of the side wall and having a flange to rest upon the yoke and holes to receive the electric wires when positioned in the openings.

4. The combination with a sheet metal casing including an annular wall with a screw hole therethrough and a boss upon the inner face of the wall, of a clamping yoke, a screw seated in the hole to engage the yoke, a stop plate having a screw hole therethrough and a pocket to receive the boss of the casing and holes to support the electric wires.

5. An electric wire outlet box having attaching means and openings to receive the cables, of a sheet metal supporting member secured to the inner wall of the box and having extensions with holes therein to receive the looms of the cables, a clamping yoke arranged between the back of the box and said extensions, and a clamping screw mounted in the side wall of the box and engaging the yoke to clamp the cable.

6. An electric wire outlet box having attaching means and openings to receive the cables, of a sheet metal supporting member fitted to the inner wall of the box having extensions with holes therein to receive the looms of the cables, and having a lug adapted to be turned over the edge of the box to secure the supporting member thereto and clamping means to secure the cable in the box.

7. An electric wire outlet box including a side wall and boss formed thereon and having attaching means and openings to receive the cables, of a sheet metal supporting member fitted to the inner wall of the box and including a recess to receive the boss and having a lug adapted to be turned over the edge of the box to secure the supporting member thereto, and means to secure the cables in the box.

Signed at Bridgeport, in the county of Fairfield and State of Connecticut, this 27th day of January, A. D. 1919.

DAVID HJORTH.

Witnesses:
C. M. NEWMAN,
LILLIAN M. ALLING.